(12) United States Patent
Mariyani et al.

(10) Patent No.: US 11,805,403 B2
(45) Date of Patent: Oct. 31, 2023

(54) SIM-BASED UPDATE MANAGEMENT

(71) Applicant: T-Mobile Innovations LLC, Overland Park, KS (US)

(72) Inventors: Anil Kumar Mariyani, Ashburn, VA (US); Rajil Malhotra, Olathe, KS (US); Patrick David Wilson, Denver, CO (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/566,963

(22) Filed: Dec. 31, 2021

(65) Prior Publication Data
US 2023/0217238 A1    Jul. 6, 2023

(51) Int. Cl.
*H04W 8/18* (2009.01)
*H04W 60/02* (2009.01)
*H04W 60/06* (2009.01)
*H04W 84/12* (2009.01)

(52) U.S. Cl.
CPC ........... *H04W 8/183* (2013.01); *H04W 60/02* (2013.01); *H04W 60/06* (2013.01); *H04W 84/12* (2013.01)

(58) Field of Classification Search
CPC ..... H04W 8/183; H04W 84/12; H04W 60/02; H04W 60/06
See application file for complete search history.

(56) References Cited

U.S. PATENT DOCUMENTS

| | | | |
|---|---|---|---|
| 7,813,730 B2 * | 10/2010 | Patel ................... | H04W 12/069 455/433 |
| 11,039,297 B1 * | 6/2021 | Desai ................ | H04W 36/0022 |
| 2021/0084486 A1 * | 3/2021 | Chauhan ............... | H04W 8/183 |

\* cited by examiner

*Primary Examiner* — Jamal Javaid
(74) *Attorney, Agent, or Firm* — SHOOK, HARDY & BACON L.L.P.

(57) ABSTRACT

Systems and methods are provided for managing updates to user devices, and in particular, SIM-based OTA updates. In some cases, SIMOTA updates need to be made while a user device has a cellular connection (e.g., 4G/LTE, 5G). As such, an instruction is transmitted to the user devices that need a SIM-based update but that currently have a non-cellular connection. The instruction is for the user devices to deregister from the non-cellular connection and to reregister using a cellular connection. An indication is received that at least a portion of those user devices now currently have a cellular connection. The SIM-based updates are then transmitted to those user devices.

18 Claims, 5 Drawing Sheets

SIM-BASED UPDATE MANAGEMENT

SUMMARY

The present disclosure is directed, in part, to managing SIM-based updates on a user device. In some instances, user devices require a cellular connection in order to receive and implement a SIM-based update, such as an Over-The-Air (OTA) SIM-based update. As such, aspects provide for a SIMOTA platform to determine which user devices in a wireless communications network require a SIM update, but that do not currently have a cellular connection to, for example, 4G/LTE, 5G (e.g., instead connected to WiFi, WLAN). In these instances, the SIMOTA platform works with other network components to instruct the user devices that do not have a cellular connection to deregister from their non-cellular connection and to reregister with cellular. Once this happens, the SIMOTA platform can then push SIMOTA updates to those user devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
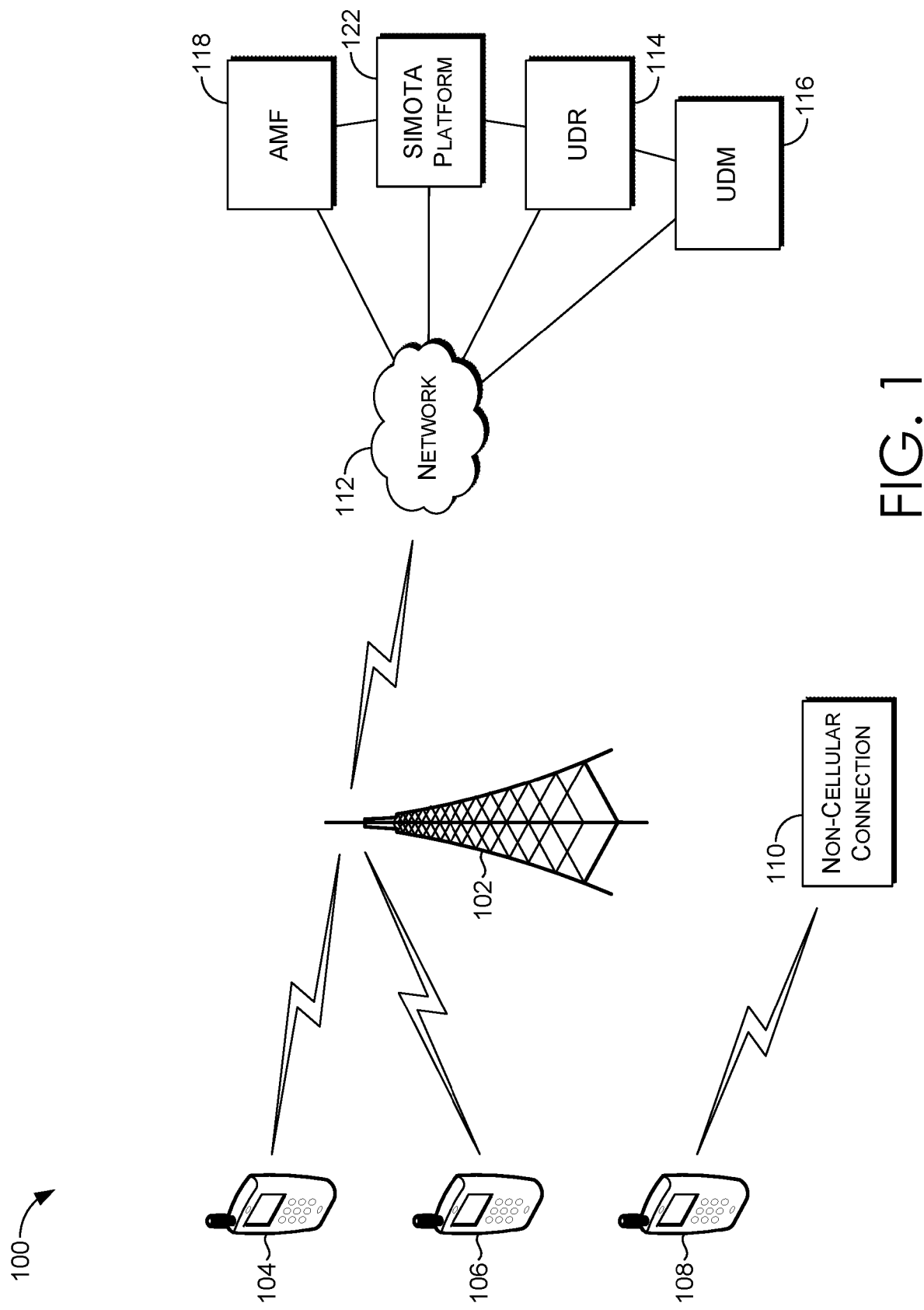
FIG. 1 depicts a diagram of an exemplary computing environment suitable for use in implementations of the present disclosure.

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, Over-The-Air (OTA) is a wireless technology that is used by networks to communicate with a SIM card, download applications to a SIM card, manage SIM cards, etc., all without being physically connected to the card. Also referred to as OTA provisioning, OTA technology allows updating and changes in data in the SIM card without having to reissue a new SIM card. More specifically, SIMOTA allow operators to manage the SIM card life cycle management, including activation of new accounts, various upgrades, roaming updates, and configuration file updates (e.g., PLMN).

One issue that frequently occurs is that many manufactures of user devices require SIMOTA updates to be done while the user device is on a cellular connection, as opposed to Wi-Fi (e.g., non-3GPP access), or some other Internet connectivity type. One other reason for this is that SIMOTA may rely on BIP protocol for communication, which is traditionally used over cellular connections. While other options exist that would allow SIMOTA updates to be performed while the user device does not have a cellular connection, some device manufactures no longer support these options (e.g., OMA procedure). As such, in many instances, service providers are waiting for user devices to reattach to cellular (e.g., 3GPP access) before performing SIMOTA operations, often resulting in SIMOTA failures/retries and causing delays in launching operator-specific features.

A first aspect of the present disclosure is directed to method for managing SIM-based updates over a wireless communications network. The method comprises, from a plurality of user devices capable of communicating over the wireless communications network, identifying a set of user devices that currently has a non-cellular connection. Further, the method comprises transmitting an instruction to each of the user devices in the set of user devices to deregister from the wireless communications network and to reregister using a cellular connection, receiving an indication that at least a portion of the user devices in the set of user devices currently have a cellular connection, and transmitting the SIM-based updates to the at least the portion of the user devices.

A second aspect of the present disclosure is directed to a system for managing SIM-based updates over a wireless communications network. The system comprises one or more processors, and one or more computer storage hardware devices storing computer-usable instructions that, when used by the one or more processors, cause the one or more processors to perform steps. These steps comprise identifying a set of user devices in the wireless communications network that currently has a non-cellular connection, and transmitting an instruction to each user device in the set of user devices to deregister from the wireless communications network and to reregister using a cellular connection. Further, the steps comprise receiving an indication that at least a portion of user devices in the set of user devices currently have a cellular connection and transmitting the SIM-based updates to the at least the portion of the user devices.

According to another aspect of the technology described herein, a method is provided for managing SIM-based updates over a wireless communications network. The method comprises identifying a set of user devices in the wireless communications network that currently has a non-cellular connection, transmitting an instruction to each user device in the set of user devices to deregister from the wireless communications network and to reregister using a cellular connection, and receiving an indication that at least a portion of user devices in the set of user devices currently have a cellular connection. Further, the method comprises transmitting one or more updates to the at least the portion of the user devices.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (55-SINR) value/measurement, and/or the like. Alternatively or additionally, in some embodiments, signal strength may also be measured and provided in terms of channel state information (CSI) values.

Turning now to FIG. 1, FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 provided service to one or more user devices, such as exemplary user devices 104, 106, and 108. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. (Example components and devices are discussed below with respect to FIG. 5.) Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through node 102. Node 102 may include one or more antennas, base transmitter stations, radios, transmitter/receivers, digital signal processors, control electronics, GPS equipment, power cabinets or power supply, base stations, charging stations, and the like. In this manner, node 102 may provide a communication link between the one or more user devices 104, 106, and 108 and any other components, systems, equipment, and/or devices of the network environment 100 (e.g., the beam management system). The base station and/or a computing device (e.g., whether local or remote) associated with the base station may manage or otherwise control the operations of components of node 102. Example components that may control the operations of components of node 102 are discussed below with respect to FIG. 5.

Node 102 may include a Next Generation Node B (e.g., gNodeB or gNB) or any other suitable node structured to communicatively couple to the one or more user devices 104, 106, and 108. Node 102 may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range or any other suitable wave properties.

In some embodiments, the one or more user devices 104, 106, and 108 may take the form of a wireless or mobile device capable of communication via the network environment 100. For example, the one or more user devices 104, 106, and 108 may take the form of a mobile device capable of communication via a telecommunication network such as, but not limited to, a wireless telecommunication network. In this regard, the one or more user devices 104, 106, and 108 may be any mobile computing device that communicates by way of a network, for example, a 3G, CDMA, 4G, LTE, WiMAX, 5G, 6G or any other type of network. The network environment 100 may include any communication network, shown as network 112, providing voice and/or data service(s), such as, for example, a 1× circuit voice, a 3G network (e.g., Code Division Multiple Access (CDMA), CDMA 2000, WCDMA, Global System for Mobiles (GSM), Universal Mobile Telecommunications System (UMTS), a 4G network (LTE, Worldwide Interoperability for Microwave Access (WiMAX), High-Speed Downlink Packet Access (HSDPA)), or a 5G network.

In addition to the one or more user devices 104, 106, and 108 and node 102, network environment 100 includes non-cellular connection 110, Access & Mobility Management Function (AMF) 118, SIMOTA Platform 122, Unified Data Repository (UDR) 114, and Unified Data Management (UDM) 116. Other network components, while may be used in processes described herein, are not shown in FIG. 1 for purposes of clarity. In network environment 100, the one or more user devices 104, 106, and 108 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with node 102 in order to interact with a public or private network.

In some implementations, node 102 is configured to communicate with user devices, such as the one or more user devices 104, 106, and 108 and other devices that are located within the geographical area, or cell, covered by the one or more antennas of node 102. Node 102 may include one or more base stations, nodes, base transmitter stations, radios, antennas, antenna arrays, power amplifiers, transmitters/receivers, digital signal processors, control electronics, GPS equipment, and the like. In one aspect, node 102 is a gNodeB, while in another aspect, node 102 is an eNodeB. In particular, the one or more user devices 104, 106, and 108 may communicate with node 102 according to any of one or more communication protocols, in order to access the network.

In aspects described herein, in some instances, user devices are required to be connected to the cellular network (e.g., 3GPP) when certain OTA updates are passed to the user devices. For instance, SIMOTA, in some cases, require user devices to be connected to the cellular network, instead of to, for example, Wi-Fi. As shown in FIG. 1, user devices 104 and 106 are connected to node 102, providing access to cellular network 112, while user device 108 has a non-cellular connection 110 (e.g., non-3GPP). This non-cellular connection could be W-Fi, Ethernet, Bluetooth, SigFox, LoRa, Satellite, Private Radio, and the like.

AMF 118 is a control plane function in the 5G core network. It's functions include registration management, rechability management, connection management, and mobility management. UDR 114 is a repository of subscriber information and can be used to service a number of network functions. UDM 116 manages network user data in a centralized element. UDM is specific for 5G, and is similar to the Home Subscriber Service (HSS) of LTE/4G. In some instances, UDM 116 can use the UDR 114 to store and retrieve subscription data, which will be shown in more detail herein.

SIMOTA platform 122 is generally responsible for pushing updates from the network 112 to the one or more user device 104, 106, and 108. In certain aspects, the SIMOTA platform 122 may assist in determining whether the one or more user devices 104, 106, and 108 have a cellular connection or non-cellular connection. In some aspects, with the help of the other component illustrated in FIG. 1, it is determined that one of more of user devices 104, 106, and 108 are not connected to cellular. For instance, as shown in FIG. 1, user device 108 has a non-cellular connection 110. Aspects allow for a request to be generated and transmitted to user device 108 requesting user device 108 deregister and reattach to cellular. Once user device 108 is reattached to cellular, the SIMOTA platform 122 is able to push SIMOTA content/updates to user device 108.

Having described the network environment 100 and components operating therein, it will be understood by a person having ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by a person having ordinary skill in the art that the number, interactions, and physical location of components illustrated in FIG. 1 are examples, as other methods, hardware, software, components, and devices for establishing one or more communication links between the various components may be utilized in implementations of the present disclosure. It will be understood to a person having ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
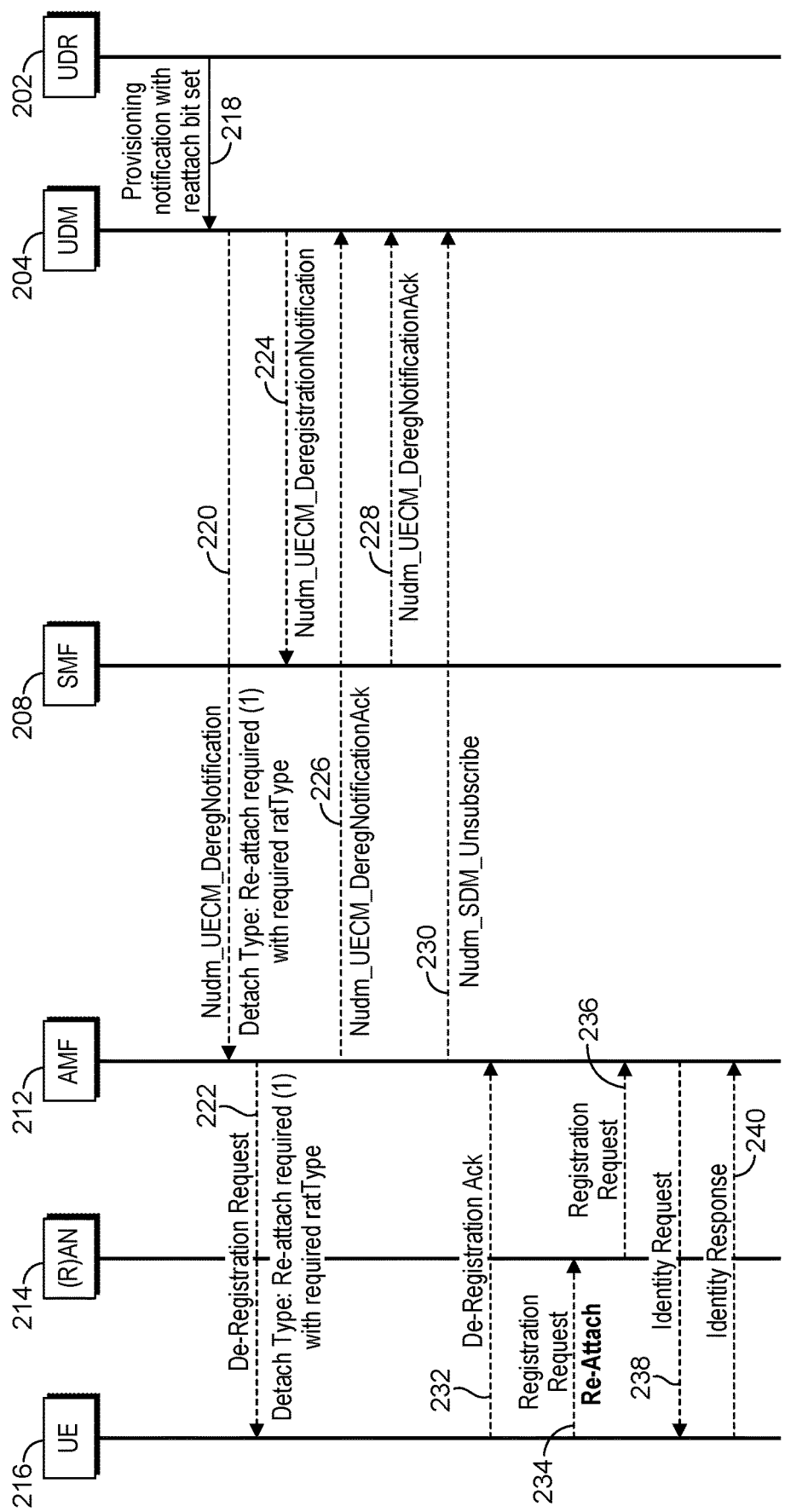
FIG. 2 depicts a diagram requesting a user device to reattach to cellular, according to various aspects herein.

FIG. 2 illustrates a diagram of a method 200 requesting a user device to detach from a non-cellular connection and to reattach to a cellular connection, according to various aspects herein. Initially, a SIMOTA platform, such as SIMOTA platform 122 of FIG. 1, has the ability to check a user device's attached network type (e.g., 3GPP v. non-3GPP) from, for instance, the UDR 202. As described in aspects herein, the SIMOTA platform identifies user devices that are attached to WiFi or some other non-3GPP access before the SIMOTA procedure takes place. Typically, the AMF 212 sends ratType (e.g., 3GPP or non-3GPP connection) to the UDM 204/UDR 202 during the 5G registration call flow. The UDR 202 stores that information for all 5G subscribers such that when the SIMOTA platform needs the ratType information, it can query the UDR 202. As described more fully herein, if the subscriber ratType is cellular (e.g., 3G, 4G/LTE, 5G/NR), the SIMOTA platform may begin the process of payload processing, or updating or sending content to the user device via SIMOTA. If the subscriber ratType is non-cellular (e.g., WLAN, WiFI), the SIMOTA platform may trigger the IT mainline switch control to deregister and send a re-registration request to the user device instructing the user device to reregister on cellular.

Once those user devices are identified, UDR 202 sends a provisioning notification with reattach bit set (illustrated by item 218) to UDM 204. UDM 204 sends a network initiated detach to AMF 212 with a reattach bit preferred network as cellular 3GPP access only (e.g., 4G or 5G) (illustrated by item 220). AMF 212 then sends a de-registration request with a reattach required (illustrated by item 222) to 3GPP to the user device 216. UDM 204 sends a deregistration notification (illustrated by item 224) to the SMF 208. AMF 212 sends the UDM 204 with a de-registration notification acknowledgement (illustrated by item 226), acknowledging that the user device 216 has deregistered. Likewise, SMF 208 sends the UDM 204 with a de-registration notification acknowledgement (illustrated by item 228), acknowledging that the user device 216 has deregistered. AMF 212 sends an unsubscribe message (illustrated by item 230) to the UDM 204. User device 216 then sends a de-registration acknowledgment (illustrated by item 232) to the AMF 212 acknowledging that it has deregistered. User device 216 then sends a registration request (illustrated by item 234) to the RAN 214, asking to be reattached to cellular. The RAN 214 forwards this request (illustrated by item 236) to the AMF 212, which sends an identity request (illustrated by item 238) to the user device 216. User device 216 sends an identity response (illustrated by item 240) back to the AMF 212.

Performing the steps, as described herein, allow for network operators to perform SIMOTA seamlessly. SIMOTA updates can be pushed at the time they need to be pushed, not waiting for user devices to connect to cellular. Additionally, forcing user devices to reattach to cellular provides benefits such as improving 5G bearer issues, avoiding calls going to voicemail, etc.

Figure 3:
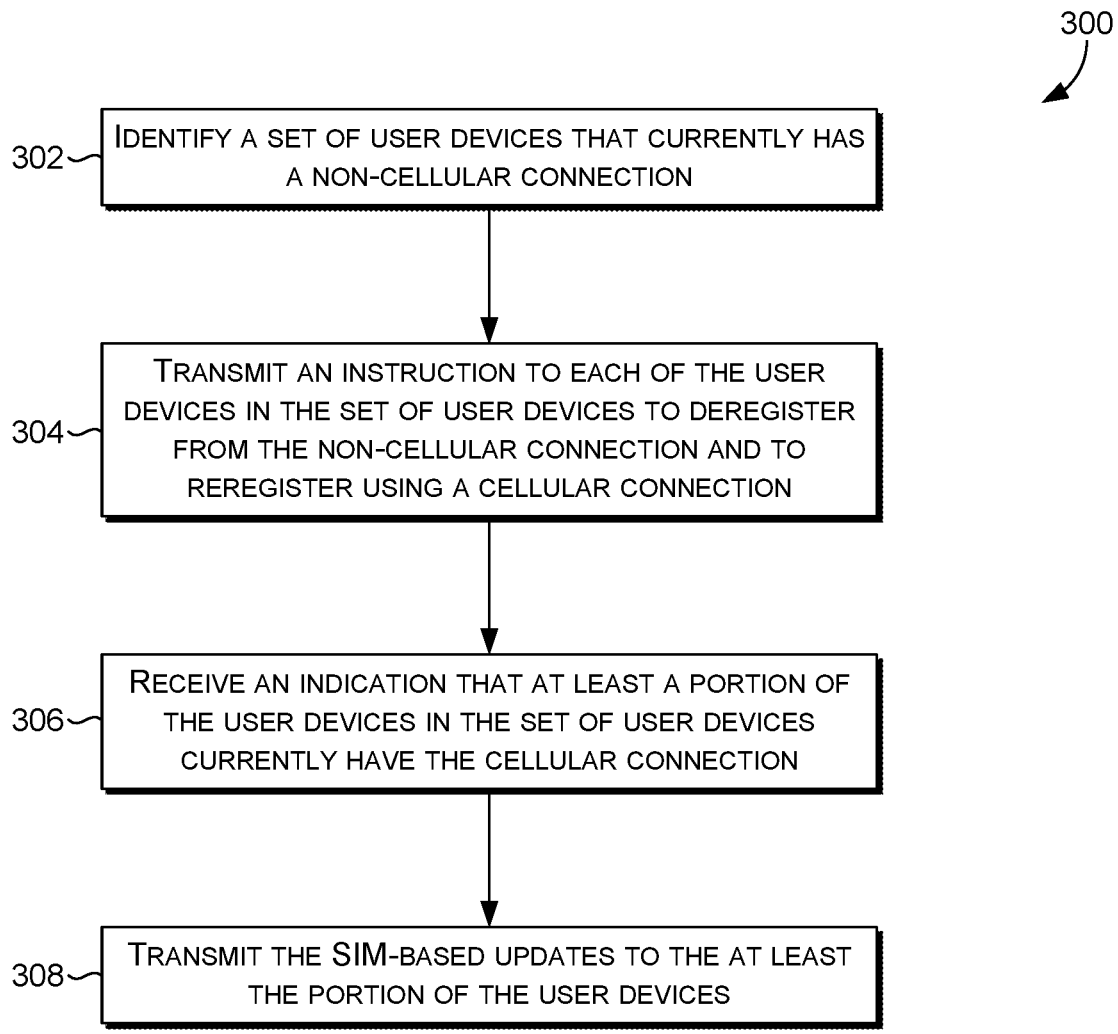
FIG. 3 depicts a flow diagram of an exemplary method for managing SIM-based updates over a wireless communications network, in accordance with aspects herein.

FIG. 3 depicts a flow diagram of an exemplary method 300 for managing SIM-based updates over a wireless communications network. At block 302, a set of user devices that currently has a non-cellular connection is identified. As mentioned above, a SIMOTA platform, such as SIMOTA platform 122 of FIG. 1, may be used to identify the user devices. At block 304, an instruction is transmitted to each of the user devices in the set of user devices to deregister from the non-cellular connection (e.g., WiFi, WLAN) and to reregister with a cellular connection (e.g., to communicate with network 112 of FIG. 1). At block 306, an indication is received that at least a portion of the user devices in the set of user devices currently has a cellular connection. At block 308, the SIM-based updates are transmitted to the at least the portion of the user devices.

Figure 4:
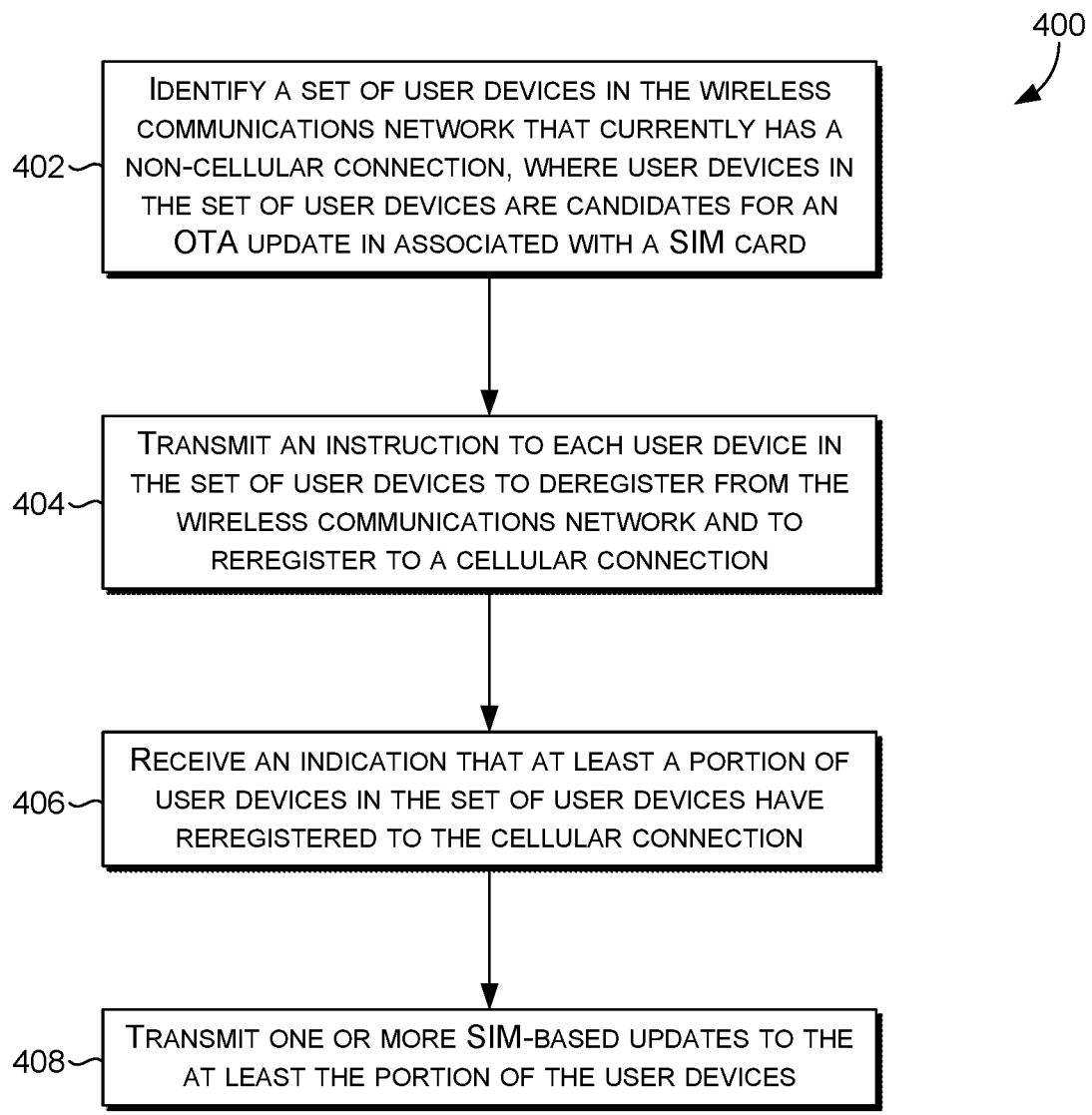
FIG. 4 depicts a flow diagram of an exemplary method for managing SIM-based updates over a wireless communications network, in accordance with aspects herein.

Turning to FIG. 4, a flow diagram is depicted of an exemplary method 400 for managing SIM-based updates over a wireless communications network, in accordance with aspects herein. At block 402, a set of user devices in a wireless communications network is identified that currently has a non-cellular connection. These user devices are candidates for an OTA update in association with a SIM card. As previously described, user devices, in many cases, need to be connected to a cellular network, as opposed to a non-cellular network before receiving SIM-based updates using OTA technology. At block 404, an instruction is transmitted to each user device to deregister from the non-cellular connection and to reregister to a cellular connection. At block 406, an indication is received that at least a portion of the user devices have reregistered and these user devices now have a cellular connection. At block 408, one or more SIM-based updates are transmitted to the user devices.

Figure 5:
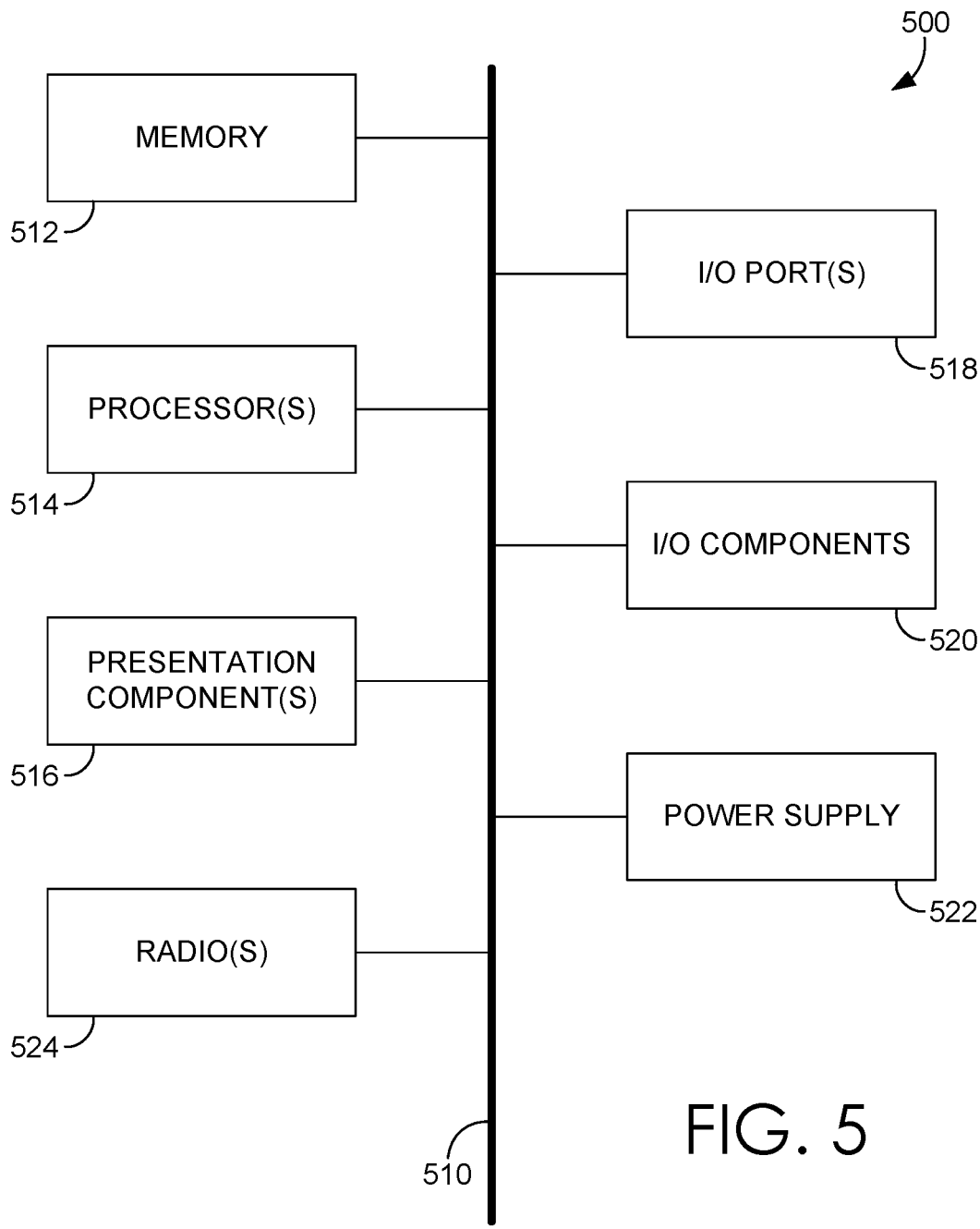
FIG. 5 depicts an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514, and radio 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for managing SIM-based updates over a wireless communications network, the method comprising:
   from a plurality of user devices capable of communicating over the wireless communications network, identifying a set of user devices that currently has a non-cellular connection;
   transmitting an instruction to each of the user devices in the set of user devices to deregister from the non-cellular connection and to reregister using a cellular connection;
   receiving an indication that at least a portion of the user devices in the set of user devices currently have the cellular connection;
   identifying, from the at least the portion of the user devices, a subset of user devices that require SIM-based updates; and
   transmitting the SIM-based updates to the subset of user devices.

2. The method of claim 1, further comprising transmitting content to the at least the portion of the user devices.

3. The method of claim 1, wherein the cellular connection is 5G or LTE.

4. The method of claim 1, where the cellular connection is a 3GPP connection.

5. The method of claim 1, where the non-cellular connection is wired, WLAN, or Wi-Fi.

6. The method of claim 1, wherein the SIM-based updates comprise SIMOTA.

7. The method of claim 1, wherein the user devices in the set of user devices are subscribed to the wireless communications network.

8. The method of claim 1, wherein the user devices in the set of user devices utilize SIM cards.

9. A system for managing SIM-based updates over a wireless communications network, the system comprising:
   one or more processors; and
   one or more computer storage hardware devices storing computer-usable instructions that, when used by the one or more processors, cause the one or more processors to:
   identify a set of user devices in the wireless communications network that currently has a non-cellular connection;
   transmit an instruction to each user device in the set of user devices to deregister from the non-cellular connection and to reregister using a cellular connection;
   receive an indication that at least a portion of user devices in the set of user devices currently have the cellular connection;
   transmit the SIM-based updates to the at least the portion of the user devices; and
   receiving conformation from a user device in the at least the portion of user devices that the SIM-based updates have been made.

10. The system of claim 9, wherein the SIM-based updates comprise Over-The-Air (OTA) updates.

11. The system of claim 9, wherein the user devices in the set of user devices utilize SIM cards.

12. The system of claim 9, wherein the non-cellular connection is wired, WLAN, or Wi-Fi.

13. The system of claim 9, wherein the cellular connection is 5G or LTE.

14. A method for managing Over-The-Air (OTA) updates over a wireless communications network, the method comprising:
   identifying a set of user devices in the wireless communications network that currently has a non-cellular connection, where user devices in the set of user devices are candidates for an OTA update in associated with a SIM card;
   transmitting an instruction to each user device in the set of user devices to deregister from the non-cellular connection and to reregister to a cellular connection;
   receiving an indication that at least a portion of user devices in the set of user devices have reregistered to the cellular connection;
   identifying, from the at least the portion of user devices, a subset of user devices that require SIM-based updates; and
   transmitting one or more SIM-based updates to the subset of user devices.

15. The method of claim 14, wherein the one or more updates comprise SIM-based updates.

16. The method of claim 15, wherein the SIM-based updates comprise Over-The-Air (OTA) updates.

17. The method of claim 14, wherein the non-cellular connection is wired, WLAN, or Wi-Fi.

18. The method of claim 14, wherein the user devices in the set of user devices utilize SIM cards.

\* \* \* \* \*